United States Patent [19]

Seitzer

[11] 3,928,550

[45] Dec. 23, 1975

[54] PROCESS FOR MAKING HYDROGEN

[75] Inventor: Walter H. Seitzer, West Chester, Pa.

[73] Assignee: Sun Ventures, Inc., St. Davids, Pa.

[22] Filed: Sept. 12, 1974

[21] Appl. No.: 505,436

[52] U.S. Cl. .................... 423/657; 423/622; 55/72
[51] Int. Cl.$^2$.... C01B 1/02; C01B 1/08; C01G 9/02
[58] Field of Search ......... 423/648, 657, 622; 55/72

[56] References Cited
UNITED STATES PATENTS

| | | | |
|---|---|---|---|
| 3,649,186 | 3/1972 | Colombo et al. ........................ | 55/72 |
| 3,803,025 | 4/1974 | Dailey................................. | 423/648 |
| 3,821,362 | 6/1974 | Spacil ................................. | 423/657 |

FOREIGN PATENTS OR APPLICATIONS

| | | | |
|---|---|---|---|
| 118,665 | 9/1918 | United Kingdom................. | 423/622 |
| 163,210 | 5/1921 | United Kingdom................. | 423/622 |

*Primary Examiner*—Edward Stern
*Attorney, Agent, or Firm*—George L. Church; Donald R. Johnson; Paul Lipsitz

[57] ABSTRACT

A process for making hydrogen which comprises reducing zinc oxide to zinc metal, combining the metallic zinc with molten lead and spraying the mixture under pressure to an oxidizer where metallic zinc is reacted with steam to yield hydrogen and zinc oxide, separating the hydrogen product under pressure, separating the zinc oxide from the molten lead, recycling zinc oxide for reduction to zinc, and recycling the lead for further use.

5 Claims, 1 Drawing Figure

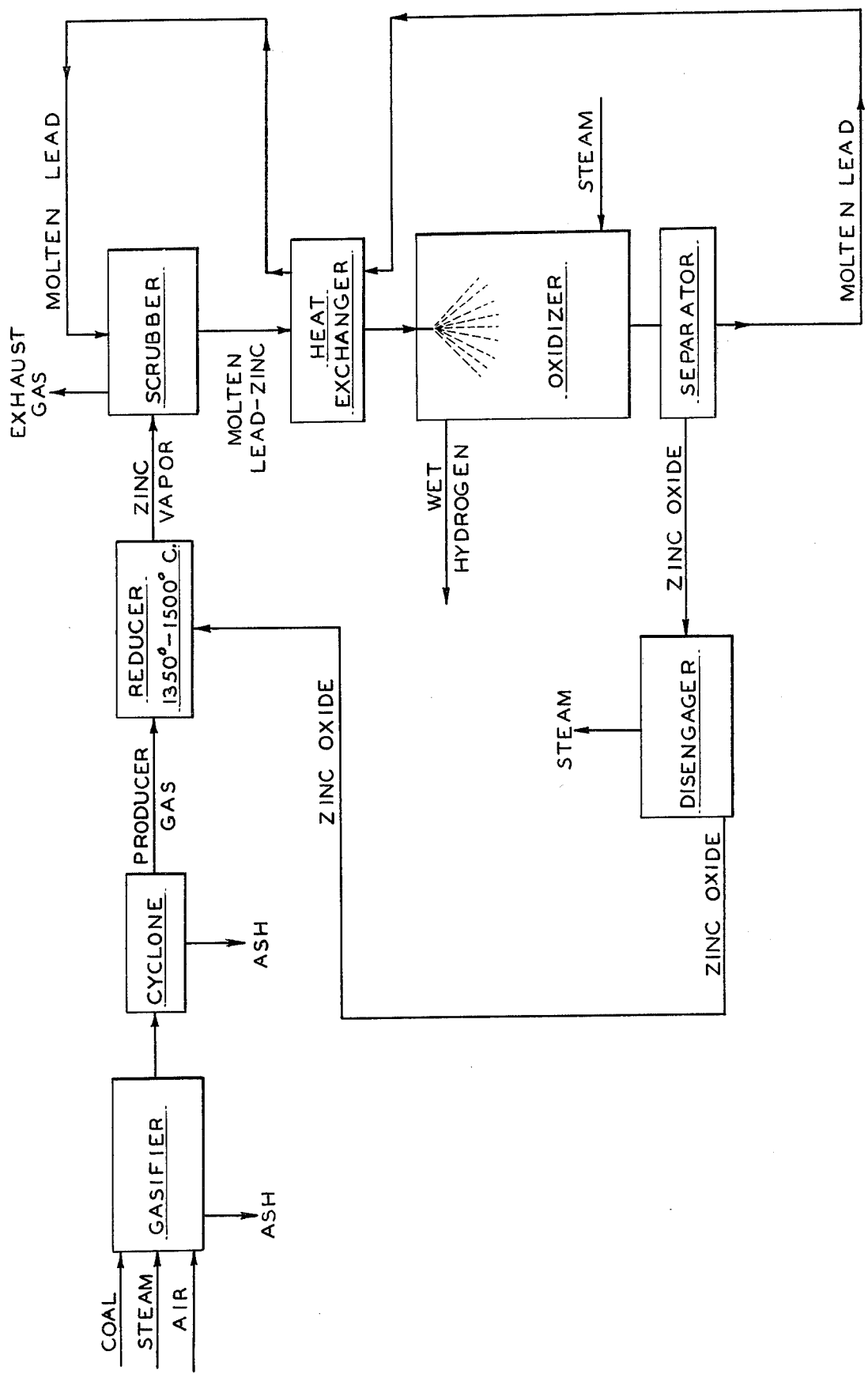

PROCESS FOR MAKING HYDROGEN

It is known in the art to manufacture hydrogen by reduction of metals and metal oxides with steam. For example, U.S. Pat. No. 2,635,947 discloses a process in which particles of various metals including iron, lead, tin, zinc, and others are reacted in a fluidized bed technique with steam to generate hydrogen, and the oxidized metals regenerated and recycled for further reaction. In dealing with particulate matter, however, several difficulties arise in the oxidizer zone where the reaction between metal and steam occurs. First of all, heat transfer between particulate solids is difficult to achieve. Secondly, the hydrogen product which is generated will be removed from the system under moderate pressure, if any, whereas it would be most desirable to obtain the hydrogen under high pressure conditions so that subsequent compression of the product hydrogen for storage is not required.

In accord with the present invention a method of preparing hydrogen by oxidation of a metal with steam is provided which avoids the heat transfer problems of particulate material and also provides a hydrogen product under high pressure. In accord with the invention, a process for making hydrogen is provided which comprises reducing zinc oxide to zinc metal, combining the metallic zinc with molten lead and spraying the liquid mixture under pressure to an oxidizer where said metallic zinc is reacted with steam to yield hydrogen and zinc oxide, separating the hydrogen product under pressure, separating the zinc oxide from the molten lead, recycling zinc oxide for reduction to zinc, and recycling the lead.

As indicated, the process of the invention is dependent upon reduction of zinc oxide to zinc and such reduction may be carried out by use of any one of a number of reducing gases such as carbon monoxide, hydrocarbon gases and the like, but will preferably employ producer gas made from coal, steam and air and the process of the invention will be illustrated with such producer gas being used. Attention is now called to the FIGURE which illustrates the process of the invention. As shown in the FIGURE, coal, steam and air are gasified and passed through a separating device such as a cyclone to remove solids (e.g., ash) from the producer gas formed. The producer gas is then passed to a reducer section where it contacts zinc oxide and forms zinc vapor. The temperature in the reducer is maintained at a temperature of from about 1,350° to about 1,500°C. During the reducing step, the carbon oxide content of the reducer gas is very efficiently used so that the resulting gas contains a low level of carbon monoxide, most of it having been oxidized to carbon dioxide, and, likewise, the hydrogen content of the gas is reduced in amount down to about 2.7%. The gases and metallic vapors from the reducer are then fed into a scrubber section where the gases are exhausted and in which molten lead contacts the zinc vapors. The scrubber is preferably packed with ceramic balls or cylinders which assist in contact between zinc vapors and molten lead. Preferably the scrubber will employ countercurrent contact where the zinc vapor rises and contacts the lead which flows downwardly. The mixture of the zinc and lead metals will result in a solution of zinc dissolved in lead where the amount of zinc in the zinc-lead solution may be from about 10% to about 50% by weight of the solution, but, will be preferably from about 20% to about 30% zinc. This solution then passes to a heat exchanger and then to the oxidizer section, using a pump to pass the molten metal solution into the oxidizer through a spray nozzle to produce fine droplets (e.g. a mist) of metal. The zinc metal diffuses to the surface of the droplets and reacts with steam to form hydrogen which is taken off as product. The lead is inert under the conditions in the oxidizer which is operated at a temperature of about 600° to about 900°C. and at a pressure of about 1,000 to about 3,000 psig. Zinc oxide is a by-product of the reaction of the metallic zinc with steam and falls to the bottom of the oxidizer where it floats on the surface of the molten lead. The zinc oxide solid is readily separated by skimming, blowing it off, or by other means and the molten lead is returned optionally, through a heat exchanger, to the scrubber section. The solid zinc oxide passes to a disengager (a cyclone) which separates steam from the solid material and the solid zinc oxide is passed back to the reducer section for reuse.

It will be understood, as explained above, that the hydrogen taken from the oxidizer will be under pressure of about 1,000 to 3,000 psig. and need merely be dried by conventional techniques and passed into storage tanks for subsequent use.

EXAMPLE

Using a flowrate on an hourly basis, 100 pounds of Wyodak coal, 3250 standard cubic feet (SCF) of air and 43.6 pounds of water as steam is passed into a gasifier at about 500°C. and 200 psig to yield 6,230 SCF of producer gas. This producer gas is then passed into the reducer section of the process at 1,500°C and at about 500 psig where it contacts 570 pounds of zinc oxide per hour. In this way 455 pounds/hr. of metallic zinc vapor is formed and 6,230 SCF/hr. of exhaust gases containing in volume percent: 5.7% CO, 26.4% $CO_2$ 1.4% $H_2$, 41.2% $N_2$, and 25.3% $H_2O$. The zinc vapor and the gases are passed to the scrubber section where the gases are exhausted and the zinc contacts 1,500 pounds of molten lead per hour to form 1,950 pounds per hour of lead-zinc liquid containing 23.3% by weight of zinc. The molten lead-zinc solution is taken to the oxidizer which is at 700°C. and about 500 psig. and is also fed with 190 pounds of water/hr. as steam. The oxidation reaction produces 2,380 SCF/hr. of wet hydrogen which is removed as product and about 570 pounds/hr. of zinc oxide. The zinc oxide, the molten lead, and about 60 pounds/hr. of water as steam from the oxidizer is taken to a separator where the zinc oxide is separated from the lead by blowing it off the surface and the lead is circulated back to the scrubber section. The steam is then disengaged from the zinc oxide which is returned to the reducer.

The invention claimed is:

1. A process for making hydrogen which comprises contacting zinc oxide at 1,350° to 1,500°C. with a reducing gas to reduce said zinc oxide to zinc metal, contacting the metallic zinc with molten lead which is inert under process conditions to obtain a solution of zinc in lead containing from about 10% to about 50% by weight and spraying the solution under pressure to an oxidizer where metallic zinc is reacted at a temperature of from about 600° to about 900°C. and at about 1,000 to 3,000 psig with steam to yield hydrogen and zinc oxide, separating the hydrogen product under pressure, separating the zinc oxide from the molten lead, recycling zinc oxide for reduction to zinc and recycling the lead for further use.

2. The process of claim 1 where the reducing gas is producer gas.

3. The process of claim 2 where the reduction of zinc oxide occurs at about 1,500°C. and at about 1,500 psig. and the lead-zinc solution is oxidized at about 700°C. and about 1,500 psig.

4. The process of claim 3 where the lead-zinc solution contains zinc in an amount of about 20% to about 30%.

5. The process of claim 1 where the solution of zinc in lead is sprayed into the oxidizer as a fine mist.

* * * * *